Figure 1:
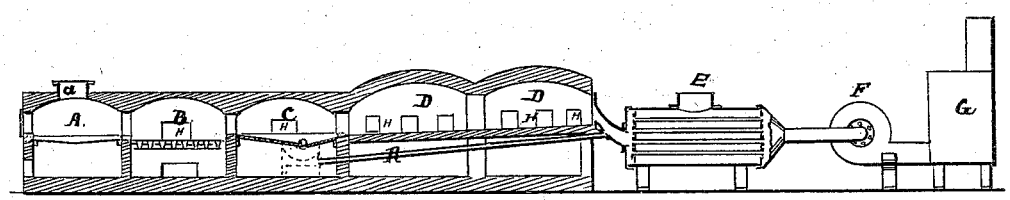

J. H. BOYD.
Reducing Ores.

No. 143,662.          Patented Oct. 14, 1873.

Witnesses:

Inventor:

UNITED STATES PATENT OFFICE.

JAMES H. BOYD, OF CHICAGO, ILLINOIS.

IMPROVEMENT IN REDUCING ORES.

Specification forming part of Letters Patent No. 143,662, dated October 14, 1873; application filed April 4, 1873.

*To all whom it may concern:*

Be it known that I, JAMES H. BOYD, of Chicago, in the county of Cook and State of Illinois, have invented certain Improvements in Furnaces for Reducing Ores containing the precious and useful metals, and for condensing the vapors in the form of oxides or other bodies, of which the following is a specification:

In the ores containing gold and silver, for which my furnace is adapted, there is associated with them sulphur, iron, lead, copper, zinc, and various other substances, causing difficulty in their reduction and separation. In the process of smelting ores containing gold, silver, lead, &c., the object aimed at is to amalgamate the valuable metals with the lead. If the ore does not already contain sufficient quantity of lead, the requisite amount must be added in richer ores in lead, or products from the refining process containing the same, so as to carry all the metals with it.

The object of my invention is to enable the operator to reduce the ore and condense the gases and vapors by a continuous process, and it is especially adapted to ores containing gold, silver, lead, and copper, and their associated substances, which require calcining and roasting in order to remove the sulphur contained therein previous to being reduced to the liquid state, and which evolve during treatment valuable volatile products.

Heretofore furnaces for this purpose have been so built that it has been necessary to open the reducing-chamber at stated periods to withdraw the liquid metal, which opening stops for the time being the process of reduction, and is attended with many obvious inconveniences.

In the present invention I employ a coking-chamber, into which the fuel is first fed to be deprived of its gases, and coked. In conjunction therewith is a combustion-chamber, into which the incandescent coked fuel is raked or pushed. These two chambers are in communication with each other, and have a common outlet into the reducing-chamber placed in line therewith. This reducing hearth or chamber receives the intense heat from the two former chambers, and is, in turn, connected to a roasting chamber or chambers, the exit-flue of which passes into a condenser surrounded by water, beyond which is placed a suction-fan, opening, in turn, into a second receiver or dry condensing-chamber, as will be presently explained.

The reducing-hearth is so constructed in the usual way that the molten metal will drain or flow toward a single point—the lowest of the hearth. From this point a pipe or conduit, always kept open, leads the lower stratum of the molten mass through the wall of the chamber to the outside, and delivers it into a small overflow-pot placed with its upper edge on a level with the bottom of the said chamber, from which overflow-pot the molten metal flows into a large receiving-pot, kept warm by a small auxiliary grate, as will be explained hereafter.

The ore to be reduced is placed in that portion of the roasting-chamber farthest from the reducing-hearth and fire, and is gradually raked down an inclined bed to said reducing-hearth, where it is melted by the increasing heat, and the metal, being the heaviest, sinks to the bottom, and flows constantly into the overflow-pot, as before stated. The slag floating on top is at length removed, when it has accumulated to such an extent as to interfere with the proper working of the furnace, or it may be discharged by a separate continuous overflow. The employment of the suction and blast fan enables me to always insure a full and sufficient draft to work the furnaces, and to induce or force the vapors through the condenser or condensers.

Take, for an example to illustrate the working of my furnace, galena ore or sulphide of lead containing silver, with some zinc associated with it, the silver combined with both. Place the same in the upper part of the roasting-chamber. The sulphide will, at a proper heat, (about 200°,) with unconsumed oxygen from the furnace, form sulphurous acid, and pass off with the gases. As the ore is conveyed farther down the heat increases, and when it reaches the reducing-chamber it is easily reduced. Zinc being volatile a little above the melting-point, a portion is volatilized and carried off—a portion of the silver with it—and is condensed in the condensing-chambers. The same results follow with other ores with which copper, antimony, &c., are associated, but not to such an extent as to their volatilization.

Figure 2:
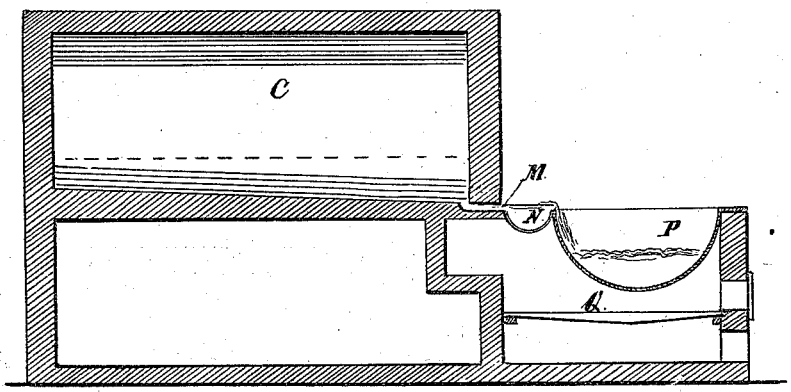

In the accompanying drawing, which forms a part of this specification, Figure 1 represents a longitudinal section of the several fire-places, reducing, roasting, and condensing chambers, &c., showing the general arrangement thereof. Fig. 2 is a cross-section of the reducing-chamber, overflow-pot, &c., upon a larger comparative scale.

In said drawing, A represents the coking-furnace or chamber into which the coal or fuel is fed through the feeding-chamber $a$, which is provided with a hinged cover at top and a trap or valve at the bottom, so that the fuel may be introduced without allowing the entrance of cold air. B is the combustion-chamber, upon the grate of which the fuel from the chamber A is raked when it has become sufficiently coked. C is the reducing hearth or chamber with a floor fitted to contain the molten ore and induce it to flow toward a single point, from whence it discharges the metal, as will appear. D is the roasting-chamber, made with an inclined floor leading up from the reducing-hearth. E is a condenser, consisting of a number of flues passing through a reservoir of water. F is a rotary suction and blast fan. G is the final receiver or condensing-reservoir. The chambers A B C D, condenser E, fan F, and reservoir G are all connected in one draft, the current being through them in the order named. The fan F may be placed between the condenser E and chamber D, if desired; but I find the location shown in the drawing to be the preferable one. I do not, however, limit myself to that precise arrangement. This fan causes a sufficient current to induce or force the draft through the condenser or condensers without difficulty, and thus produces a perfect reduction and condensation. H are doors in the several chambers. The reducing-chamber C is of the ordinary fashion, excepting the means of discharge, which are as follows: A discharge pipe or conduit, M, proceeds from the lowest point of the surface of the hearth through the wall or bottom and discharges into a small overflow-pot, N, below which is placed a receiving-pot, P, which is surrounded by an auxiliary or warming furnace, Q, the draft-flue of which, R, leads into the general draft, as shown.

The ore to be reduced is placed in the upper end of the roasting-chamber D where it is subject to the passing heated vapors and gases. From this point it is gradually worked down into the reducing-chamber, by which it becomes melted, and the metal being the heaviest sinks to the bottom, and, finding the lowest point, flows through the conduit M into the overflow-pot N, from whence it overflows continuously into the receiving-pot P, being kept fluid therein by means of the furnace Q. The conduit M is kept continuously open, and, the upper rim or edge of the overflow-pot N being placed upon a level with the surface of the reducing-hearth, the outlet M is therefore kept full, and all access of external air to the said reducing-chamber is prevented, thus preventing oxidation of the metal within said chamber, and as the outlet is below, or from the lowest stratum of the melted mass, pure metal flows out unaccompanied by slag or impurities, which pass off through a separate higher outlet, not shown, or are allowed to remain floating upon the surface.

Having thus fully described my invention, that which I deem new, and desire to secure by Letters Patent, is—

1. The combination and arrangement of the coking-chamber A $a$, the combustion-chamber B, the reducing-chamber C with its separating-hearth, and the roasting-chamber D, substantially as specified.

2. In combination with a reducing-chamber or separating-hearth, the conduit or pipe M located substantially as specified, the overflow-pot N, and receiving-vessel P, substantially as specified and shown.

3. The combination and arrangement, substantially as specified, of the chambers A B C D, condensers E G, and fan F or its equivalent.

4. The combination of the fan F with a reducing-furnace provided with a condenser or condensers, substantially as specified, located in the rear of said furnace.

JAMES H. BOYD.

Witnesses:
HEINRICH F. BRUNS,
JOHN W. MUNDAY.